United States Patent [19]

Cooper et al.

[11] 4,179,003
[45] Dec. 18, 1979

[54] SEAL FOR A ROLLING CONE CUTTER EARTH BORING BIT

[75] Inventors: Thomas W. Cooper, Mansfield; Ernest E. Taylor, Irving, both of Tex.

[73] Assignee: Dresser Industries, Inc., Dallas, Tex.

[21] Appl. No.: 971,776

[22] Filed: Dec. 21, 1978

[51] Int. Cl.$^2$ .............................................. E21B 9/08
[52] U.S. Cl. .................................... 175/371; 308/8.2
[58] Field of Search ............... 175/371, 372, 374, 228, 175/229; 308/8.2; 277/91, 92, 188 A

[56] References Cited

U.S. PATENT DOCUMENTS

| | | | |
|---|---|---|---|
| 1,884,965 | 10/1932 | Baggett et al. | 308/8.2 |
| 2,187,037 | 1/1940 | Kirkpatrick | 175/372 X |
| 3,195,421 | 7/1965 | Rumsey et al. | 277/92 X |
| 3,277,797 | 10/1966 | Tyree, Jr. | 277/188 R |
| 3,467,448 | 9/1969 | Galle | 175/372 X |
| 3,612,197 | 10/1971 | Motoyama | 175/372 X |
| 3,656,764 | 4/1972 | Robinson | 175/371 X |
| 3,713,707 | 1/1973 | Bennett | 308/8.2 |
| 3,944,306 | 3/1976 | Neilson | 308/8.2 X |

Primary Examiner—James A. Leppink
Assistant Examiner—Richard E. Favreau
Attorney, Agent, or Firm—Eddie E. Scott

[57] ABSTRACT

A seal acts as a barrier to the drilling fluid, pulverized cuttings and other materials in a borehole preventing the materials from entering the bearing area of a rolling cone cutter earth boring bit and retains lubricant inside the bearing area. A rolling cone cutter is rotatably mounted on a cantilevered bearing pin extending from the bit body. A "Z" seal is positioned between the cutter and bearing pin. An outer rigid seal ring is positioned around the bearing pin. The outer rigid seal ring is split to allow radial expansion and contraction. An inner rigid smaller diameter seal ring is positioned around the bearing pin. The inner rigid seal ring is also split to allow radial expansion and contraction. An elastomer ring is located between the inner and outer rigid rings and affixed to the rigid rings. Fluid in the borehole causes the elastomer ring to force the inner rigid ring to contract into tighter contact with the bearing pin and the lubricant between the bearing pin and the rolling cone cutter causes the elastomer ring to force the outer rigid ring to expand into tighter contact with said rolling cone cutter thereby preventing the ingress or egress of fluid and materials.

1 Claim, 6 Drawing Figures

SEAL FOR A ROLLING CONE CUTTER EARTH BORING BIT

TECHNICAL FIELD

The present invention relates to the art of rolling cone cutter earth boring bits and, more particularly, to a rolling cone cutter earth boring bit with seal means for sealing the bearings of the bit from the abrasive materials in the borehole and retaining lubricant within the bearing area.

BACKGROUND OF THE INVENTION

A rolling cone cutter earth boring bit includes a main bit body adapted to be connected to a rotary drill string. The bit includes rotatable cone cutters mounted on individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant must be maintained proximate the bearing systems throughout the lifetime of the bit. Various forms of prior art seals have been provided between the cone cutters and the bearing pins upon which they are mounted to retain lubricant and prevent contamination; however, the need for new sealing systems is as acute today as at any time in the history of earth boring.

A rolling cone cutter earth boring bit must operate under very severe conditions, and the size and geometry of the bit is restricted by the operating characteristics. At the same time, a longer lifetime and improved performance is needed from the bit. In attempting to provide an improved bit, new and improved materials have been developed for the cutting structure of the cone cutters. They have provided a longer useful lifetime for the cone cutters. This has resulted in the sealing and bearing systems of the bit being often the first to fail during the drilling operation. Consequently, a need exists for new and improved sealing and bearing systems to extend the useful lifetime of the bit and to allow development of other elements that interact with the sealing and bearing systems. In attempting to improve the bearing systems, new and improved sealing systems are needed to maintain the bearing area free of harmful materials and retain lubricant. In attempting to provide such new sealing systems, great care must be taken that the overall capacity of the bearing systems is not reduced.

DESCRIPTION OF PRIOR ART

In U.S. Pat. No. 3,761,145 to Percy W. Schumacher, Jr., patented Sept. 25, 1973, a drill bit seal means is shown. A drill bit including a roller cutter mounted on a greased bearing journal having a grease seal ring therearound and resilient means mounted between the seal ring and bearing journal to urge the seal ring against a sealing surface on the cutter in such a manner that the seal ring may be forced away from the cutter surface by some predetermined pressure from within the cutter but wherein the seal ring arrangement provides a substantially positive seal from pressures externally of the cutter to prevent detritus or other foreign material from entering into the bearing area interiorly of the drill bit cutter is provided. Elastomeric material may be provided between the seal ring and the cutter sealing surface.

In U.S. Pat. No. 3,656,764 to William P. Robinson, patented Apr. 18, 1972, a seal assembly for a drill bit is shown. An earth boring drill bit employing roller cutters is provided with an improved seal for inhibiting ingress of abrasive materials into the bearing surfaces and egress of lubricant. The improved seal is between an outwardly facing re-entrant corner on the journal and an inwardly facing re-entrant corner on the cutter. The seal is made by a pair of O-rings engaging the opposed re-entrant corners and separated by a floating rigid ring having opposed bearing surfaces for seating the O-rings into the corners. This seal accommodates radial, axial and angular displacements of almost twice the magnitude that can be accommodated by a single O-ring of the size of one of the O-rings without significantly increasing the length of journal needed for the seal.

In U.S. Pat. No. 3,397,928 to E. M. Galle, patented Aug. 20, 1968, a seal means for drill bit bearings is shown. The seal means includes a shaft rigidly secured to a drill bit body with a bearing surface formed thereon. A cutter element is rotatably mounted to said shaft and includes a bearing surface thereon that opposes and engages the bearing surface on the shaft. A resilient packing ring is positioned in a groove in one of the surfaces. The packing ring, the groove and an opposing surface are sized such that upon assembly of the cutter element upon the shaft the cross sectional thickness of the packing ring is compressed by not less than substantially 10% of this thickness prior to assembly of the cutter element upon the shaft.

Other drill bit bearing systems are shown in U.S. Pat. No. 1,884,965 to Baggett, U.S. Pat. No. 2,797,067 to Fisher, U.S. Pat. No. 3,075,781 to Atkinson, U.S. Pat. No. 3,096,835 to Neilson, U.S. Pat. No. 3,151,691 to Goodwin, U.S. Pat. No. 3,303,898 to Bercaru, U.S. Pat. No. 3,529,840 to Durham and U.S. Pat. No. 3,862,762 to Millsap.

SUMMARY OF THE INVENTION

The present invention provides a sealing system for a rotary rock bit that acts as a barrier to the drilling fluid, pulverized cuttings and other materials in the borehole to prevent the materials from entering the bearing area of the bit and retains lubricant within said bearing area. A bearing pin extends from the body of the rock bit. A rolling cone cutter is rotatably mounted on the bearing pin. The rolling cone cutter has a cutter mouth. A seal assembly is positioned around the bearing pin within the cutter mouth and located between the bearing pin and the rolling cone cutter. The seal assembly includes an elastomeric seal ring and two split rigid seal rings. The split rigid rings are located on either side of the elastomeric ring and made from material strong enough to resist extrusion through clearance gaps and to exclude abrasive contaminants. The seal assembly utilizes fluid pressure to force the split rigid rings over the clarance gaps thereby effectively reducing them to acceptable dimensions. The above and other features and advantages of the present invention will become apparent upon consideration of the following detailed description of the invention when taken in conjunction with the accompanying drawings.

DETAILED DESCRIPTION OF THE INVENTION

Figure 1:
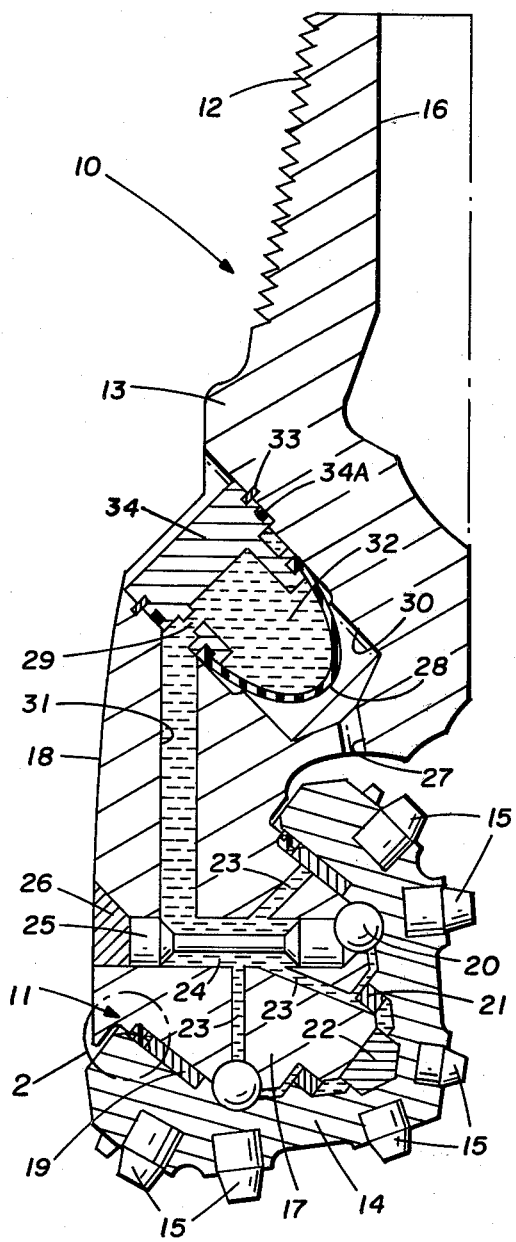
FIG. 1 is an illustration of an earth boring bit constructed in accordance with the present invention.

Referring now to FIG. 1, a sectional view of one arm 18 of a three cone rotary rock bit 10 is shown. It is to be understood that the structure of the other two arms are substantially identical to the arm 18. A cutter 14 is rotatably positioned on the journal portion or bearing pin 17 of the arm 18 and adapted to disintegrate the earth formations as the bit 10 is rotated. The bearing pin 17 projects from the cutter receiving surface of the arm 18. The cutting structure 15 on the surface of cutter 14 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 14.

The body 13 of the bit 10 includes an upper threaded portion 12 that allows the bit 10 to be connected to the lower end of a rotary drill string (not shown). The bit 10 also includes a central passageway 16 extending along the central axis of the bit to allow drilling fluid to enter from the upper section of the drill string (not shown) immediately above and pass downward to the bottom of the well bore to flush cuttings and drilling debris from the well bore.

A plurality of bearing systems are located in the bearing area between the cutter 14 and the bearing pin 17. The bearing systems in the bearing area include an outer friction bearing 42, a series of ball bearings 20, an inner friction bearing 21, and a thrust button 22. A seal asssembly generally designated by the reference number 11 is positioned between the cutter 14 and the bearing pin 17. The seal assembly acts to retain lubricant in the bearing area around the bearing systems and prevents any materials in the well bore from entering the bearing area. The details of the seal assembly 11 will be explained subsequently. Passageways are provided to allow lubricant to be transmitted to the bearing systems. The passageway 24, as shown, also allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area.

A bore 30 extends into the body 13 from the surface of the bit body. A passage 31 extends from the bore 30 to the passageway 24. A lubricant reservoir is located in the bore 30. The lubricant reservoir is located between a flexible diaphragm 28 and a reservoir cap 34. An O-ring seal 34A prevents borehole fluid from by-passing the upper portion of the reservoir cap 34 and lubricant within the lubricant reservoir from escaping into the borehole. A retaining ring 33 holds reservoir cap 34 in position in bore 30. The flexible diaphragm 28 prevents lubricant in the lubricant reservoir from escaping into the bore 30 and fluid in the borehole that has entered bore 30 through passage 27 from entering the lubricant reservoir. Lubricant within the lubricant reservoir is channeled into the passage 31 through opening 29 and is directed to the bearings.

Figure 2:
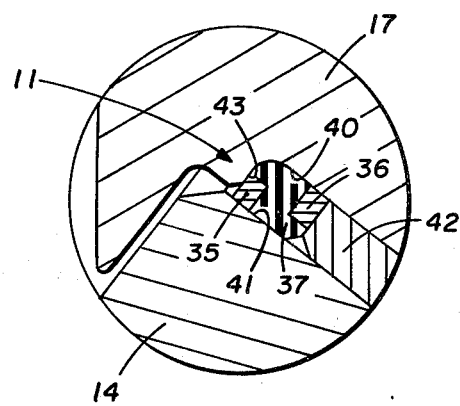
FIG. 2 is an enlarged view of the seal of the bit shown in FIG. 1.

Referring now to FIG. 2, an enlarged view of the seal assembly 11 is shown. The seal assembly 11 is positioned between the bearing pin 17 and rolling cone cutter 14. The seal assembly 11 provides a bearing seal which will work in the presence of abrasives and oil well drilling mud to effectively seal the bit 10. The seal assembly 11 can rotate against either face; that is, the rotating element or the stationary element.

The seal assembly 11 includes three parts. Two split rigid back-up type rings 35 and 36 and one elastomeric ring 37 are included. The elastomeric seal ring 37 supports the back-up rings 35 and 36 and provides the force necessary to move the back-up rings over the clearance gaps both axially and radially. The seal assembly 11 will seal pressure in both directions. It will seal a gap on the O.D. on one side and on the I.D. on the other. The seal assembly 11 is positioned between surface 40 on the bearing pin 17 and a surface 41 on the cone cutter 14. The seal assembly 11 is also positioned between the bushing 42 and the bearing pin surface 43. The seal assembly 11 includes the metal rings 35 and 36 or rings of some other similarly rigid material. The metal rings 35 and 36 are split rings. The seal assembly 11 acts as a static seal due to the press-fit or interference fit compressing the elastomer ring 37 between the inside surface 41 of the cone cutter and the surface 40 on the bearing pin 17.

Figure 3:
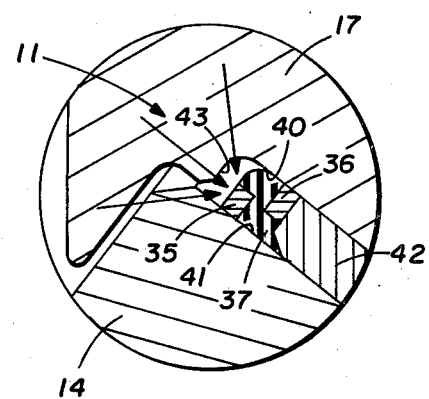
FIGS. 3 and 4 are schematic illustrations of the sealing function of the seal shown in FIGS. 1 and 2.
Figure 4:
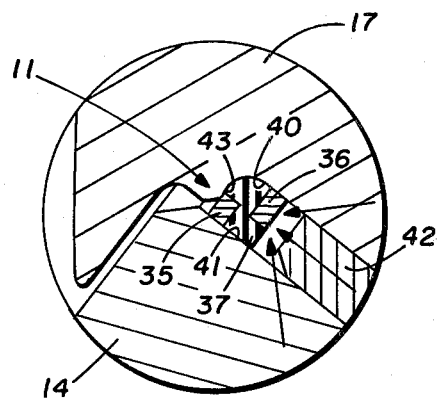

The structural details of an earth boring bit 10 constructed in accordance with the present invention having been described, the operation of the bit 10 will now be considered with reference to FIGS. 3 and 4. The lubrication system of the bit 10 is filled with a suitable lubricant. The bit is rotated and thrust downward, thrusting the cutter 14 against the earth formations. Continued rotation with the drill string applying a thrust force to the bit 10 causes the cutters to disintegrate the formations and form the desired borehole. The present invention provides seal assembly 11 in the cone mouth of the cutter 14 which will act as a barrier to the pulverized cuttings, the borehole fluid and any other materials in the borehole. The seal assembly 11 acts to prevent these materials from entering the bearing area through the cone mouth opening, thus providing an uncontaminated environment for the metal bearing elements and eliminating the abrasive wearing action of foreign materials in the bearing area. The lubricant is retained within the bit 10 by the seal assembly 11 to assure a long lifetime for the bearing systems. The seal 11 can rotate against either face; that is, the rotating element 14, or against the stationary element 17 and provides a metal-to-metal seal which is resistant to entry of abrasives and also provides a rubber-to-metal seal to gain an initial bubble-tight seal for filling and test purposes. The seal assembly 11 provides back-up rings 35 and 36 on either side of the elastomeric ring 37 made from material strong enough to resist extrusion through large clearance gaps and to exclude abrasive contaminants. The seal utilizes the fluid pressure to force the back-up rings 35 and 36 over the clearance gaps thereby effectively reducing them to acceptable dimensions.

As illustrated in FIG. 3, the pressure of fluid in the borehole acts on the elastomeric ring 37 forcing the inner split rigid ring 36 to contract and form a tight seal with bearing pin 17. The pressure of lubricant inside the bit acts on the elastomeric ring 37 forcing the outer split ring 35 to expand and form a tight seal with rolling cone cutter 14. The back-up rings 35 and 36 are split to permit unrestricted expansion or contraction radially as required to cover the clearance gaps and compensate for normal back-up ring wear.

Figure 5:
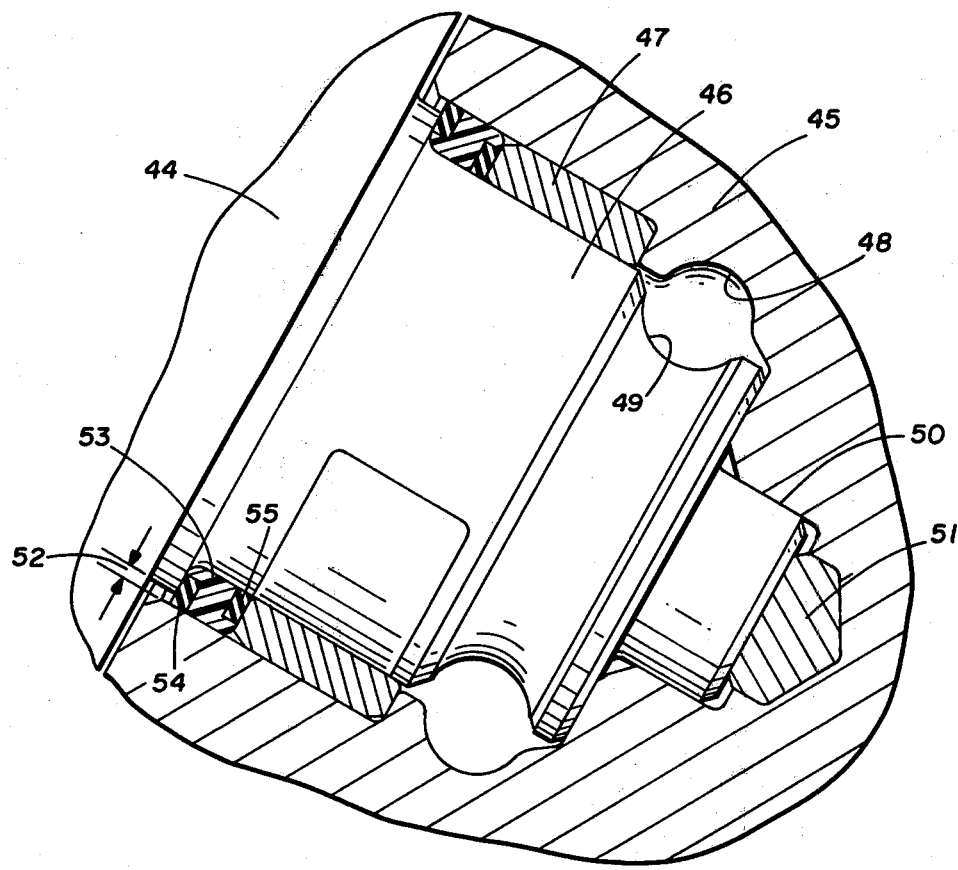
FIGS. 5 and 6 illustrate another embodiment of an earth boring bit constructed in accordance with the present invention.

Referring now to FIG. 5, a sectional view of one arm 44 of a three cone rotary rock bit illustrating another embodiment of the present invention is shown. It is to be understood that the structure of the other two arms are substantially identical to the arm 44. A cutter 45 is rotatably positioned on the journal portion or bearing pin 46 of the arm 44 and adapted to disintegrate the earth formations as the bit is rotated. A plurality of bearing systems are located in the bearing area between the cutter 45 and the bearing pin 46. The bearing systems in the bearing area include an outer friction bearing 47, a ball bearing system including ball bearing raceways 48 and 49, an inner friction bearing 50, and a thrust button 51. A seal assembly acts to retain lubricant in the bearing area around the bearing systems and prevent any materials in the well bore from entering the bearing area.

Figure 6:
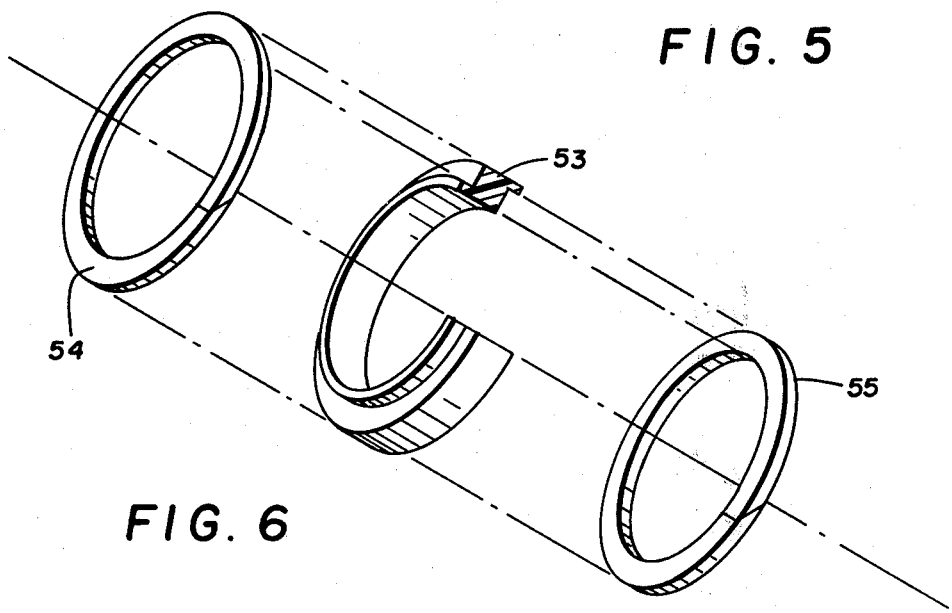

The seal assembly is positioned between the bearing pin 46 and rolling cone cutter 45. The seal assembly provides a bearing seal which will work in the presence of abrasives and oil well drilling mud to effectively seal the bit. The seal assembly can rotate against either face. As shown in FIG. 6, the seal assembly includes three parts. Two split plastic rigid rings 54 and 55 and one elastomeric ring 53. The elastomeric seal ring 53 supports the back-up rings 56 and 55 and provides the force necessary to move the back-up rings over the clearance gaps both axially and radially. The seal ring 53 is made of an elastomeric material such as nitrile or silicone rubber of about 70 to 90 durometer hardness. The back-up rings 54 and 55 are made from a tough, pliable plastic such as teflon, glass-filled teflon, or "Nylatron".

The structural details of an earth boring bit constructed in accordance with a second embodiment of the present invention having been described, the operation of the bit will now be considered with reference to FIGS. 5 and 6. The bit is rotated and thrust downward, thrusting the cutter 14 against the earth formations. Continued rotation with the drill string applying a thrust force to the bit 10 causes the cutters to disintegrate the formations and form the desired borehole. The present invention provides a seal assembly in the cone mouth of the cutter 45 which will act as a barrier to the pulverized cuttings, the borehole fluid and any other materials in the borehole. The seal assembly acts to prevent these materials from entering the bearing area through the cone mouth opening, thus providing an uncontaminated environment for the metal bearing elements and eliminating the abrasive wearing action of foreign materials in the bearing area. The lubricant is retained within the bit by the seal assembly to assure a long lifetime for the bearing systems.

The seal assembly provides back-up rings 54 and 55 on either side of the elastomeric ring 53 made from material strong enough to resist extrusion through large clearance gaps and to exclude abrasive contaminants. The seal assembly utilizes fluid pressure to force the back-up rings 54 and 55 over the clearance gaps thereby effectively reducing them to acceptable dimensions. The seal assembly protects the gland on the O.D. if the clearance gap is on the O.D. and on the I.D. if the clearance gap is on the I.D. The back-up rings are split to permit unrestricted expansion or contraction radially as required to cover the clearance gaps and compensate for normal back-up ring wear.

The embodiments of the invention in which an exclusive property or privilege is claimed are defined as follows:

1. A rolling cone cutter earth boring bit for operation in a fluid-filled borehole, comprising:
 - a bit body, said bit body having at least one downwardly extending arm;
 - a cantilevered bearing pin extending from said arm;
 - a rolling cone cutter rotatably mounted on said bearing pin, said rolling cone cutter having a cone mouth;
 - bearing and cutter retaining means between said bearing pin and said rolling cone cutter;
 - lubricant between said bearing pin and said rolling cone cutter;
 - an outer rigid seal ring positioned around said bearing pin within said cone mouth, said outer rigid seal ring comprising an annular rigid ring that is split to allow radial expansion and contraction, said outer rigid seal ring positioned to be in contact with said rolling cone cutter in said cone mouth;
 - an inner rigid seal ring positioned around said bearing pin within said cone mouth, said inner rigid seal ring comprising an annular rigid ring that is split to allow radial expansion and contraction, said inner rigid ring being smaller in diameter than said outer rigid ring and positioned to be in contact with said bearing pin in said cone mouth inside said outer rigid seal ring; and
 - an elastomer ring located between said outer and inner rigid rings in said cone mouth, said elastomer ring being affixed to said outer and inner rigid rings, whereby fluid in said borehole can cause said elastomer ring to force said inner rigid ring to contract into tighter contact with said bearing pin and said lubricant between said bearing pin and said rolling cone cutter can cause said elastomer ring to force said outer rigid ring to expand into tighter contact with said rolling cone cutter.

* * * * *